(12) United States Patent
Akiyama

(10) Patent No.: US 8,508,644 B2
(45) Date of Patent: Aug. 13, 2013

(54) IMAGING APPARATUS WITH DISPLAY UNIT FOR DISPLAYING IMAGE OF AN IMAGING SUBJECT

(75) Inventor: Satoru Akiyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 225 days.

(21) Appl. No.: 12/941,924

(22) Filed: Nov. 8, 2010

(65) Prior Publication Data

US 2011/0109784 A1    May 12, 2011

(30) Foreign Application Priority Data

Nov. 10, 2009   (JP) ................................. 2009-257336

(51) Int. Cl.
*H04N 5/222*   (2006.01)

(52) U.S. Cl.
USPC .................................................. 348/333.06

(58) Field of Classification Search
USPC .................... 348/333.06; D16/200, 218, 220
See application file for complete search history.

(56) References Cited

U.S. PATENT DOCUMENTS

| | | | |
|---|---|---|---|
| 6,658,272 B1 * | 12/2003 | Lenchik et al. | 455/575.1 |
| 6,677,936 B2 * | 1/2004 | Jacobsen et al. | 345/211 |
| 7,146,197 B2 * | 12/2006 | Kang et al. | 455/575.1 |
| 7,174,195 B2 * | 2/2007 | Nagamine | 455/575.1 |
| D614,683 S * | 4/2010 | Oikawa et al. | D16/206 |
| 7,884,881 B2 * | 2/2011 | Suzuki | 348/375 |
| 8,063,969 B2 * | 11/2011 | Oshima et al. | 348/333.01 |
| 2003/0073447 A1 * | 4/2003 | Ogaki et al. | 455/456 |
| 2004/0174452 A1 * | 9/2004 | Kinemura et al. | 348/333.06 |
| 2005/0041130 A1 * | 2/2005 | Yoon et al. | 348/333.01 |
| 2007/0229694 A1 * | 10/2007 | Oshima et al. | 348/333.06 |
| 2008/0036876 A1 * | 2/2008 | Kaneda et al. | 348/230.1 |
| 2008/0225156 A1 * | 9/2008 | Kim | 348/333.06 |
| 2008/0239142 A1 * | 10/2008 | Suzuki | 348/376 |

FOREIGN PATENT DOCUMENTS

| | | |
|---|---|---|
| CN | 101562695 A | 10/2009 |
| JP | 2005-210677 A | 8/2005 |

* cited by examiner

*Primary Examiner* — Sinh Tran
*Assistant Examiner* — Christopher K Peterson
(74) *Attorney, Agent, or Firm* — Canon USA, Inc., IP Division

(57) ABSTRACT

An imaging apparatus includes a display unit capable of being displaced between a non use state and a use state in such a manner that a display surface displaying an image of a subject is directed at least to the subject or a user in the use state, and a display control unit that inverts a direction in a vertical direction of the image of the subject displayed on the display surface in response to an operation on an operation member when the display unit is in the use state and cancels the inversion when the display unit is in the non use state.

7 Claims, 14 Drawing Sheets

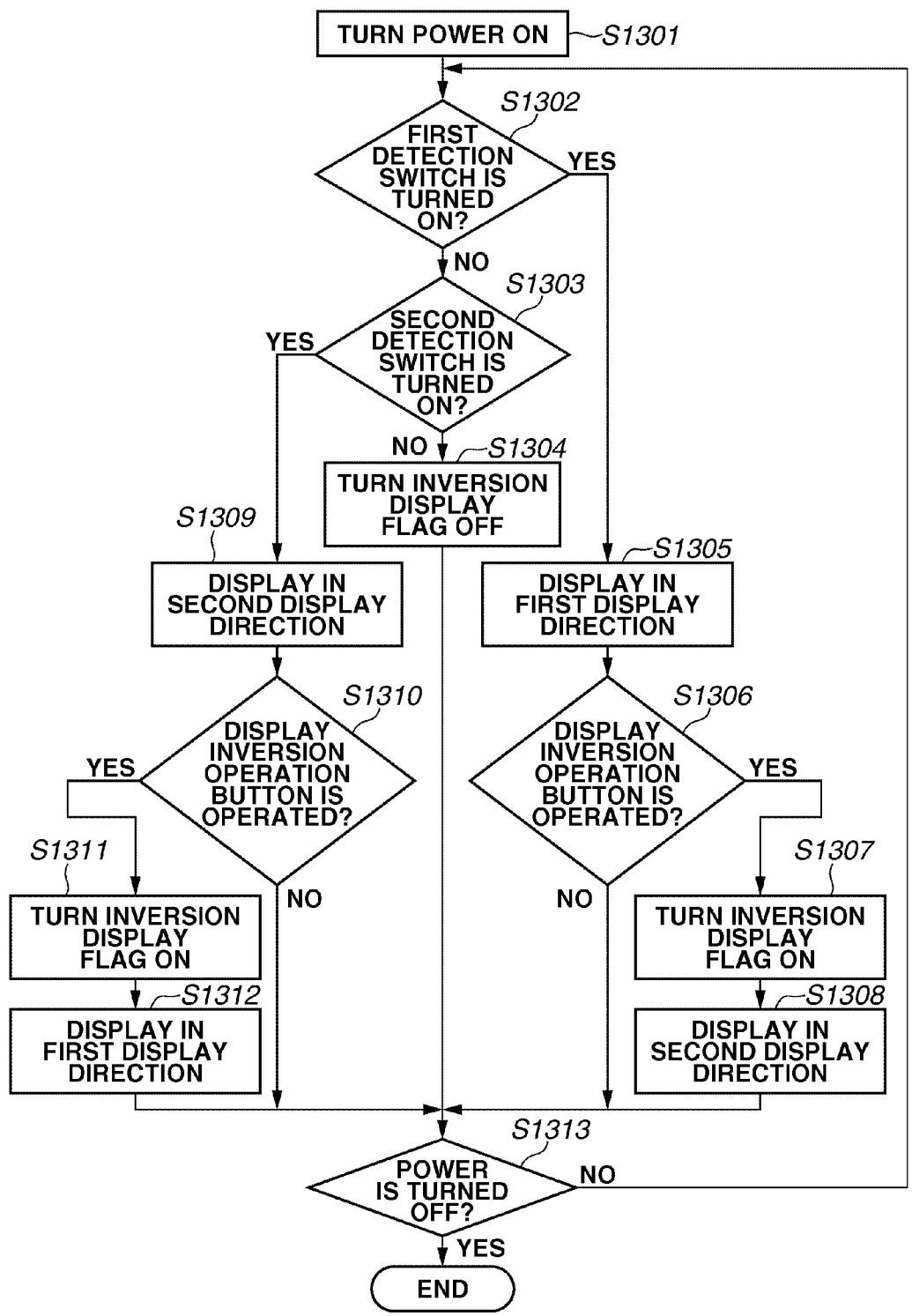

IMAGING APPARATUS WITH DISPLAY UNIT FOR DISPLAYING IMAGE OF AN IMAGING SUBJECT

BACKGROUND OF THE INVENTION

1. Field of the Invention

The present invention relates to an imaging apparatus, specifically, an imaging apparatus provided with a display unit that displays an image of an imaging subject.

2. Description of the Related Art

In recent years, as imaging apparatuses such as a digital still camera and a video camera, those provided with a display unit for displaying an image that is being imaged have widely been used. As the display unit, a display panel having a relatively large screen size of 3.5 inches or the like is often used for the purpose of easy visual confirmation of the image. When the display unit is of the large size, since an area occupied by the display unit is large for an image apparatus main body, the imaging apparatus has a structure that the display unit is connected to a side of the imaging apparatus main body via a rotation mechanism such as a hinge, and folded toward the imaging apparatus main body.

Further, Japanese Patent Application Laid-Open No. 2005-210677 discusses a configuration that the display unit and the imaging apparatus main body are rotatable about a rotation axis, whereby a user (person who performs imaging) can change an angle of the display unit to an angle that is easily viewed by the user.

However, when the user images himself/herself, it is not always preferable that the image displayed on a flat monitor is automatically inverted by a predetermined phase. More specifically, the user desires to confirm the image from various directions in some cases, and, in such cases, it is preferable for the user to arbitrarily invert a display direction of the image rather than to have the display direction automatically inverted. On the contrary, when the inversion setting once set is continued until the user cancels the setting, usability is deteriorated.

SUMMARY OF THE INVENTION

According to an aspect of the present invention, there is provided an imaging apparatus including a display unit capable of being displaced between a non use state and a use state in such a manner that a display surface displaying an image of a subject is directed at least to the subject or a user in the use state, and a display control unit that inverts a direction in a vertical direction of the image of the subject displayed on the display surface in response to an operation on an operation member when the display unit is in the use state and cancels the inversion when the display unit is in the non use state.

According to the present invention, a user can arbitrary change a display direction of a display unit irrespective of a position of the display unit and can cancel the changed display direction at an appropriate timing.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 14 is a flowchart illustrating a processing operation of the imaging apparatus.

DESCRIPTION OF THE EMBODIMENTS

Figure 1:
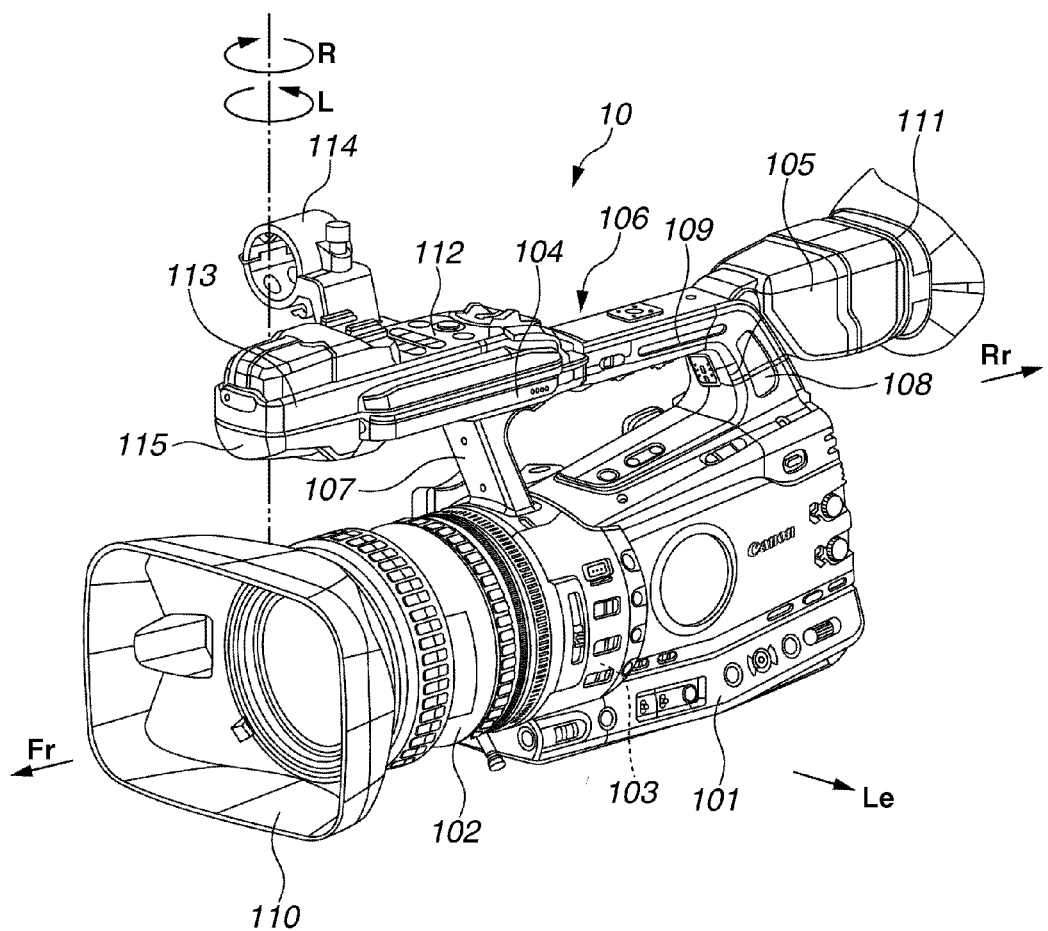
FIG. 1 is a perspective view illustrating an imaging apparatus as viewed from the front side.

Various exemplary embodiments, features, and aspects of the invention will be described in detail below with reference to the drawings.

Hereinafter, an imaging apparatus according to the present exemplary embodiment will be described with reference to FIGS. 1 to 14. In the present exemplary embodiment, a video camera is described as an imaging apparatus. In the drawings, front, rear, right, and left of a video camera are indicated by an arrow Fr, an arrow Rr, an arrow Ri, and an arrow Le.

Figure 2:
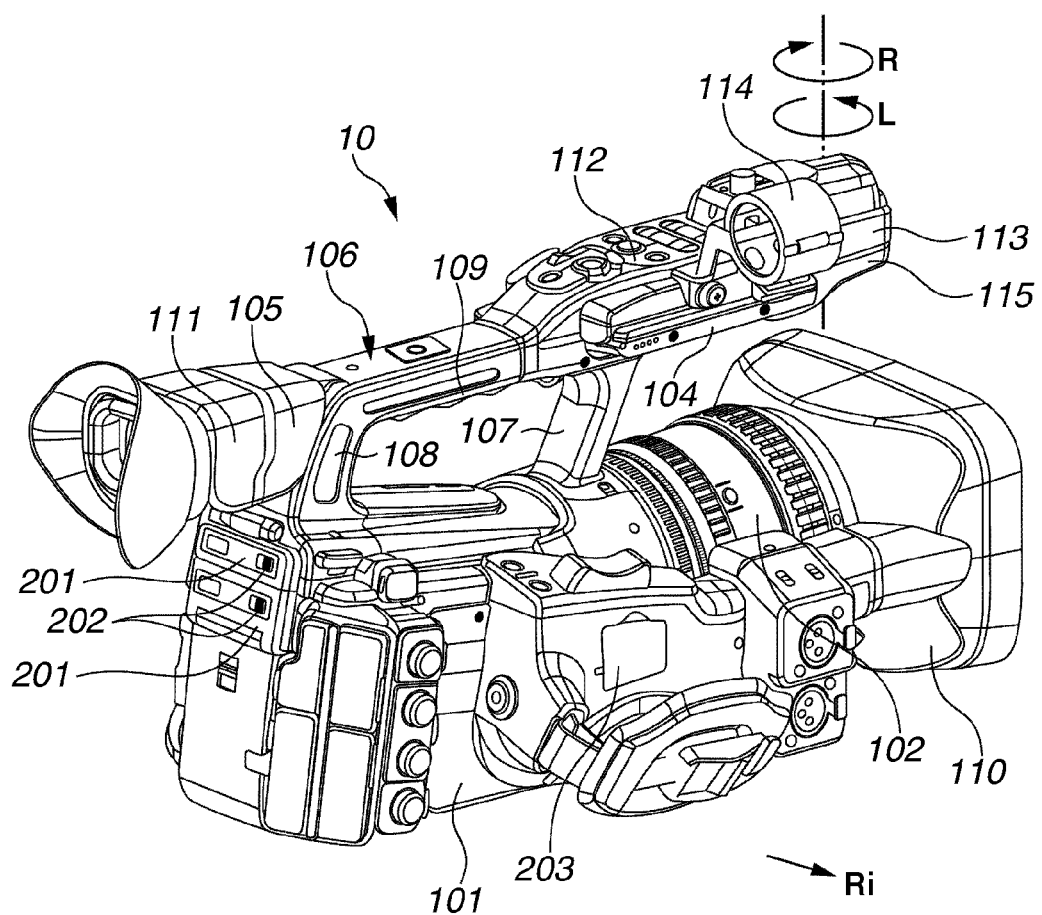
FIG. 2 is a perspective view illustrating an imaging apparatus as viewed from the rear side.
Figure 3:
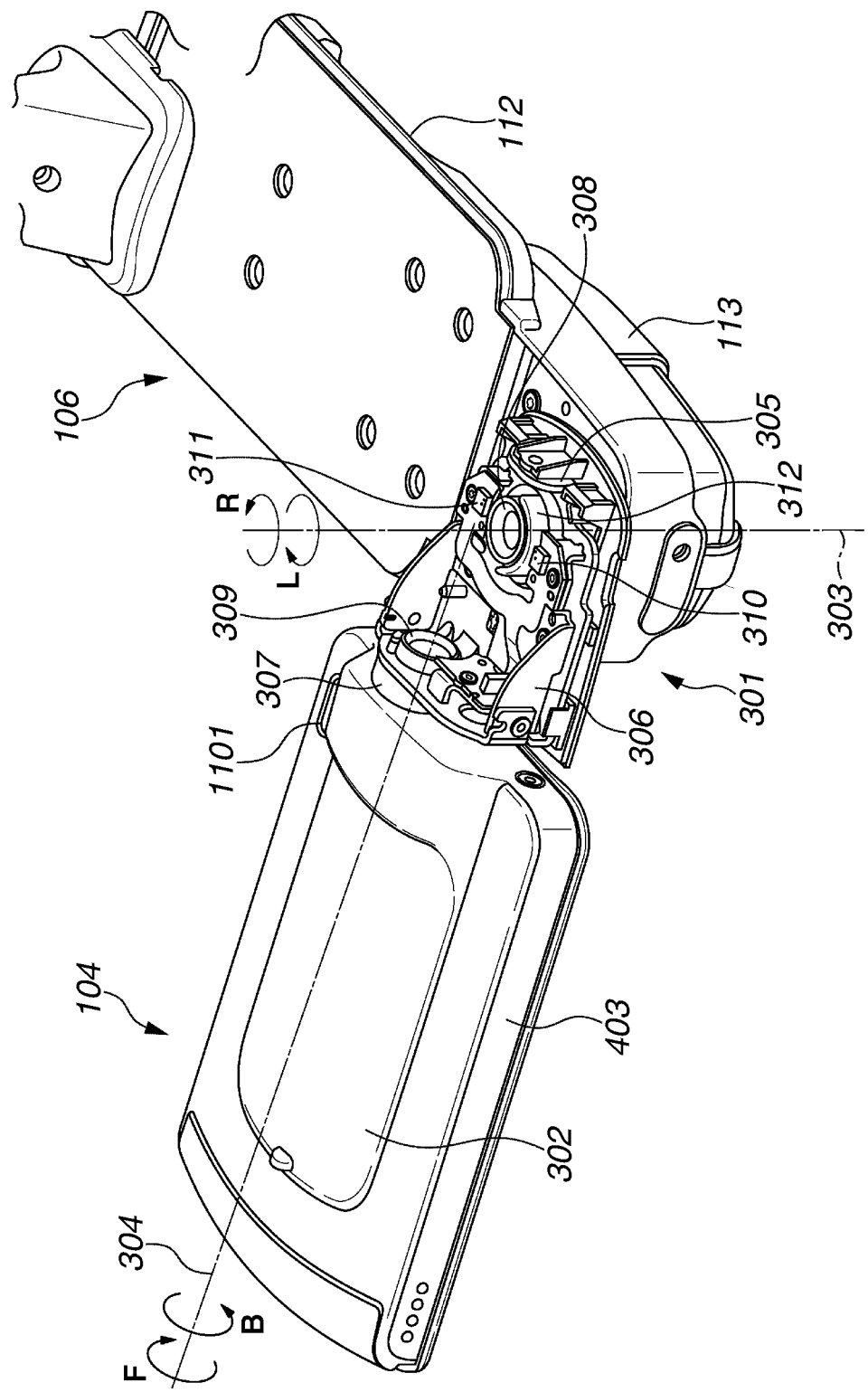
FIG. 3 is an enlarged perspective view illustrating a rotated display unit as viewed from the bottom side.
Figure 4:
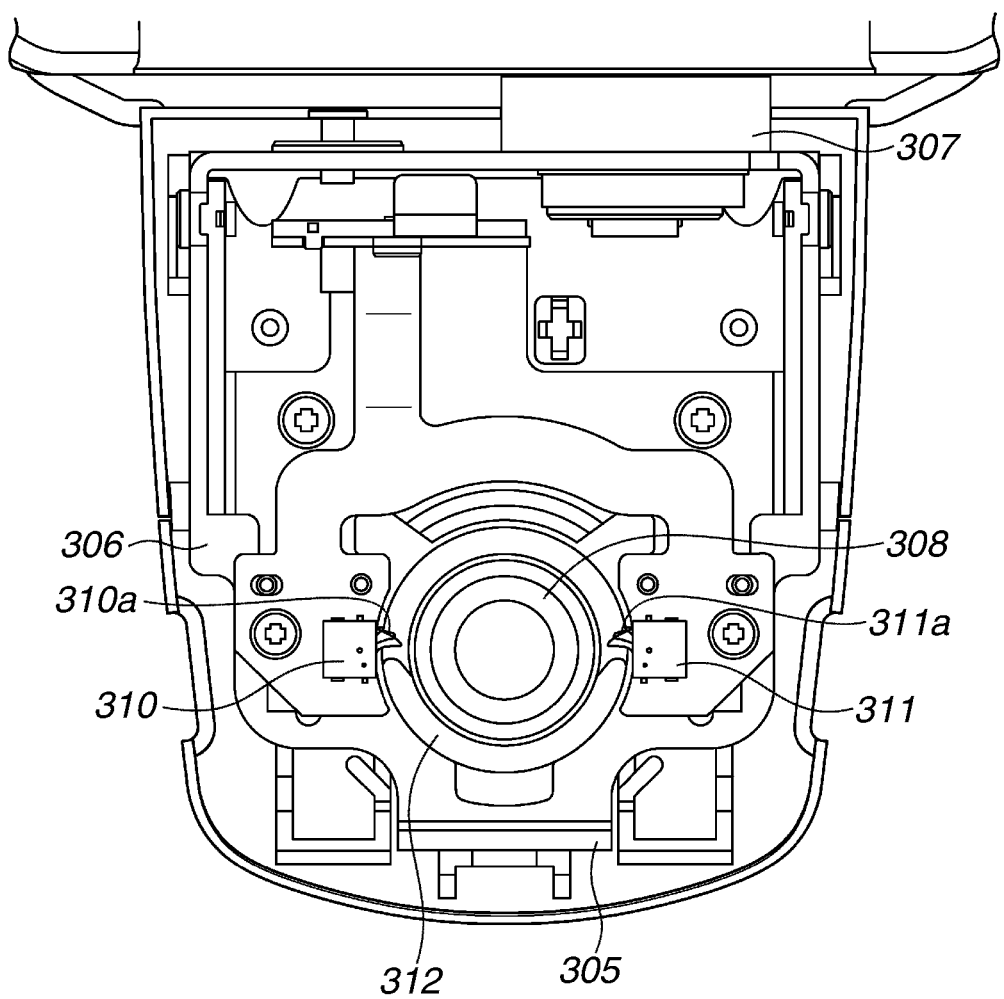
FIG. 4 is a diagram illustrating a structure of a rotation mechanism.
Figure 11:
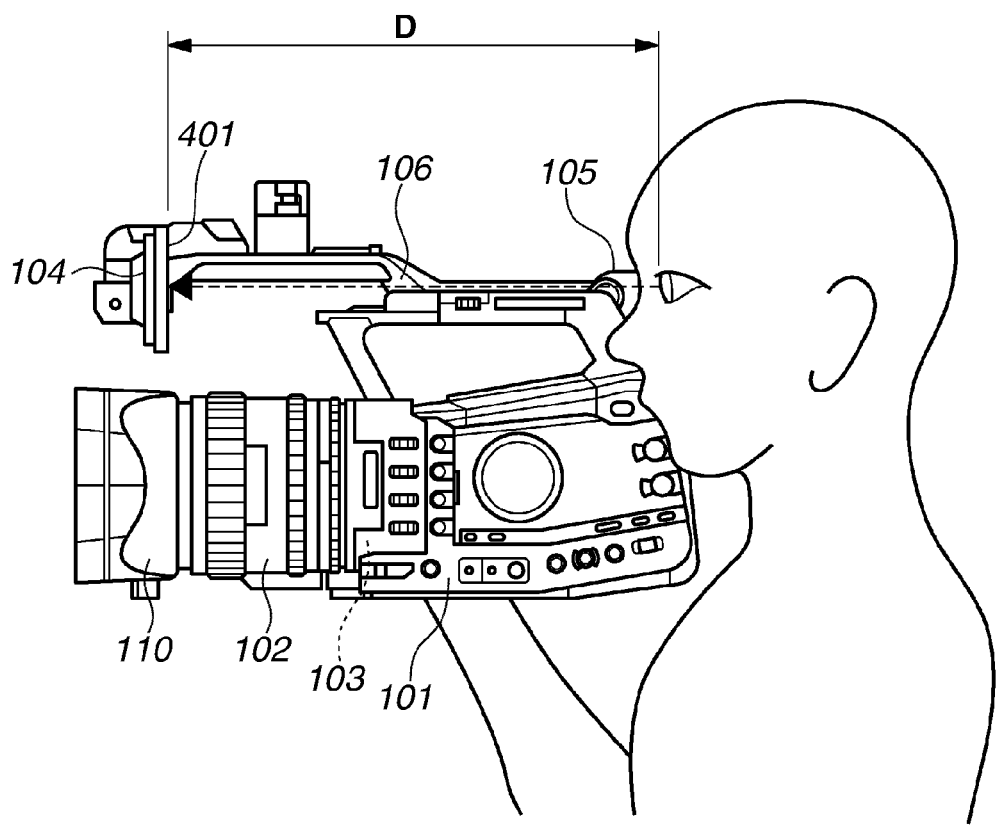
FIG. 11 is a diagram illustrating a state in which a position of the display surface of the display unit is located at a position of the eye of the user.
Figure 12:
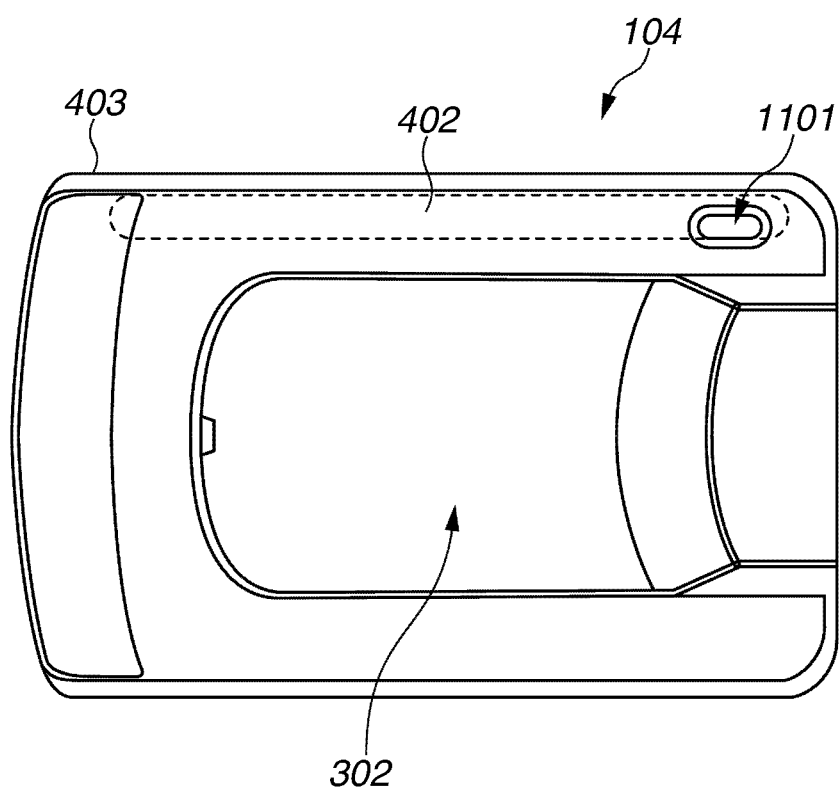
FIG. 12 is a diagram illustrating a back surface of the display surface of the display unit.
Figure 13:
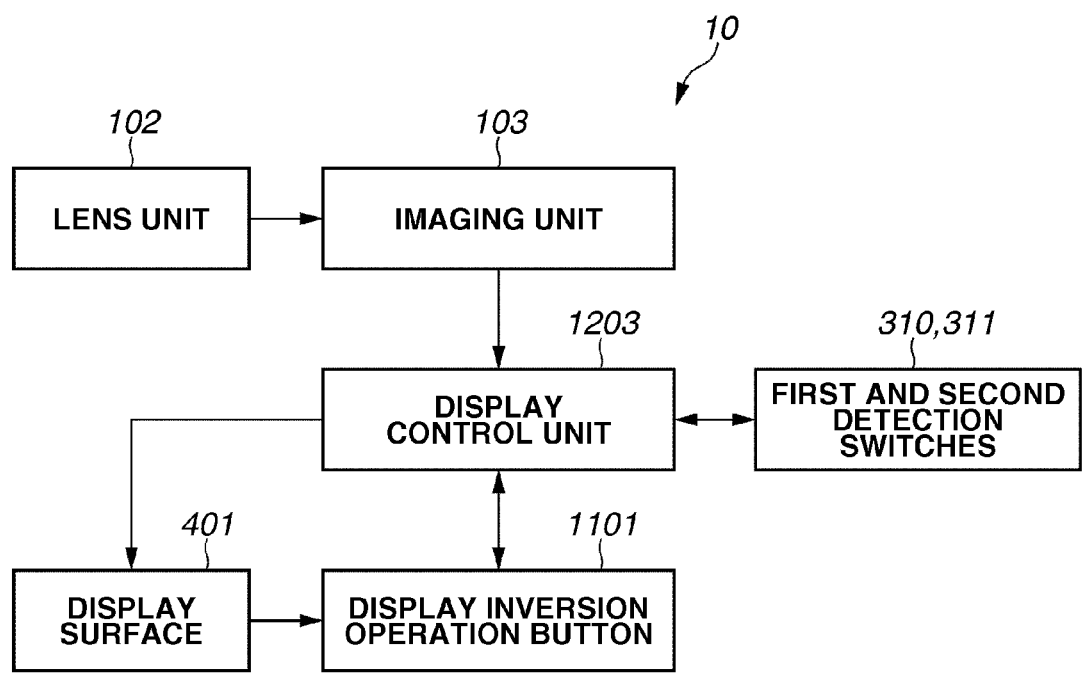
FIG. 13 is a block diagram schematically illustrating a structure of the imaging apparatus.

FIGS. 1 and 2 are perspective views each illustrating the video camera. FIG. 3 is a diagram illustrating a display unit and a rotation mechanism thereof. FIG. 4 is a diagram illustrating a structure of the rotation mechanism. FIGS. 5 to 10 are perspective views each illustrating a use state of the video camera. FIG. 11 is a diagram illustrating a use state of the video camera. FIG. 12 is a diagram illustrating a back surface of the display unit. FIG. 13 is a block diagram illustrating the video camera. FIG. 14 is a flowchart illustrating an operation processing relating to display inversion of the video camera.

The video camera 10 according to the present exemplary embodiment includes a camera main body 101, a lens unit 102, an imaging unit 103, a monitor 104, and an electronic view finder 105. The camera main body 101 is one specific example of the imaging apparatus main body. The lens unit 102 is attached to project frontward from the camera main body 101. A lens hood 110 that blocks unnecessary light from entering into the lens unit 102 is removably amounted on the lens unit 102.

The monitor 104 is the display unit configured to display an image or a moving image based on a video signal generated by the imaging unit 103 or information preliminarily recorded on an information recording medium. Since the monitor 104 is in a non use state in FIGS. 1 and 2, a part thereof is illustrated.

The imaging unit 103 is disposed inside the camera main body 101 and generates an image signal of a subject based on light that enters from the lens unit 102. The imaging unit 103 has a memory holder (not illustrated) to which a nonvolatile memory such as a flash memory is removably mounted, and a recording and reproducing unit (not illustrated) that performs recording (writing) and reproducing (reading) of an image signal to the attached nonvolatile memory.

The imaging unit 103 has a control unit (not illustrated) that performs driving control and the like of the recording and reproducing unit. Further, as the imaging unit 103, a charge coupled device (CCD) sensor, which is one specific example of the imaging unit 103, is disposed at the rear and on an optical axis of the lens unit 102, and the CCD sensor converts information into an electric signal to record the electric signal on the nonvolatile memory.

An insertion slot of the memory holder is exposed when an access cover 201 provided on the camera main body 101 and illustrated in FIG. 2 is opened. The access cover 201 is provided rotatably on the camera main body 101 and capable of opening and closing. An access cover button 202 illustrated in FIG. 2 serves to release locking of the access cover 201.

By sliding the access cover button 202, the access cover 201 is rotated about an axis that rotatably supports the access cover 201, and the access cover 201 is opened upward or downward of the camera main body 101. In the present exemplary embodiment, the number of each of the memory holders and the access covers 201 is two, but the number may be one or three or more.

A grip portion 203, which is provided with a grip belt and the like, is integrally provided on the camera main body 101 at a right side of the camera main body 101. The user supports the grip portion 203 by the right hand to keep an imaging posture of holding the video camera 10.

A handle portion 106, which extends in a longitudinal direction that is the optical axis direction of the lens unit 102 is integrally provided on an upper part of the camera main body 101. The handle portion 106 includes a front leg portion 107 provided upright at a front upper part of the camera main body 101, a rear leg portion 108 provided upright at a rear upper part of the camera main body 101, and a handle grip portion 109, which extends in substantially parallel to the optical axis of the lens unit 102 and connects upper ends of the front leg portion 107 and the rear leg portion 108.

The above-described electronic view finder 105 is disposed at the rear of and above the rear leg portion 108. The electronic view finder 105 is provided in such a manner that the electronic view finder 105 continuously projects from a rear part of the handle grip portion 109 to a direction that is substantially the same with the extending direction of the handle grip portion 109.

An eye cup 111 is provided at a tip part of the electronic view finer 105. The electronic view finder 105 is rotatably supported at the rear part of the handle grip portion 109, and the tip part is configured to rotate upward in a direction of about 70 degrees in the present exemplary embodiment.

Also, as illustrated in FIGS. 1, 2, and 5 to 10, a mount portion 112, which continues to a front end of the handle grip portion 109, and a projected portion 113 continuously projecting from a front end of the mount portion 112 to a frontward direction of the optical axis are provided at a front end part of the handle portion 106. The projected portion 113 has a hollow part opened in frontward and horizontal directions, and a microphone (not illustrated) is accommodated inside the hollow part.

An external microphone holding portion 114 that holds an external microphone such as a gun microphone is provided at a position on the right side of the mount portion 112. The mount portion 112 has a housing portion at its lower part, and the monitor 104, which is rotatable relative to the mount portion 112 via a rotation mechanism provided inside a rotation support portion protection member 115, is in the non use state.

Figure 5:
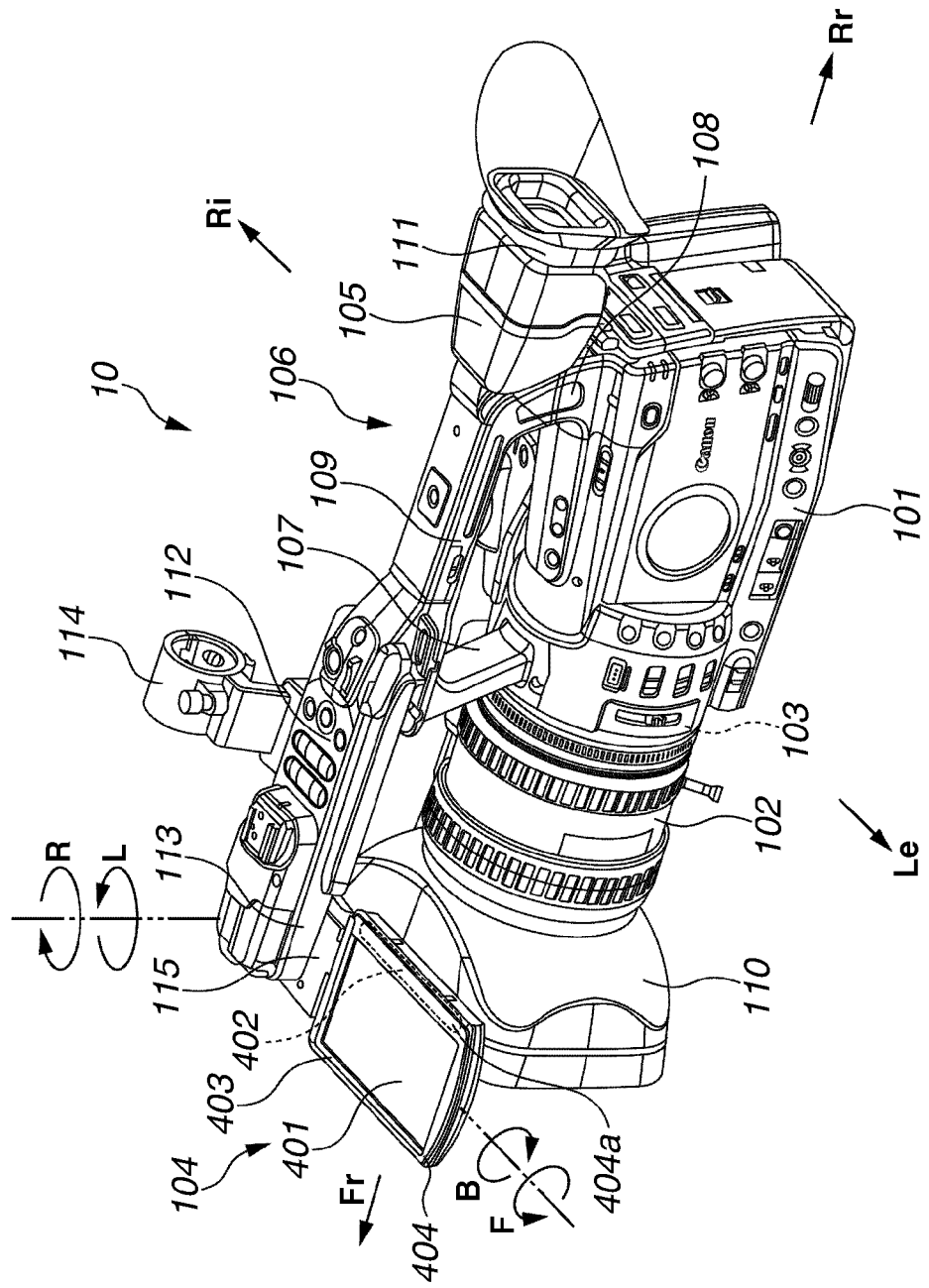
FIG. 5 is a perspective view illustrating the imaging apparatus as viewed from the rear side, in which the display unit is rotated clockwise.

As illustrated in FIG. 5, the monitor 104 includes a display surface 401 that is in the form of a flat surface and displays an image or a moving image (hereinafter simply referred to as image) of a subject imaged by the imaging unit 103, and a casing 403 of which an opening for exposing the display surface 401 is formed. In the present exemplary embodiment, a liquid crystal display is used as the monitor 104.

Hereinafter, the rotation mechanism of the monitor 104 will be described with reference to the perspective view illustrated in FIG. 3. FIG. 3 is the perspective view illustrating the projected portion 113 viewed from the bottom, in which the rotation support portion protection member 115 is omitted.

The monitor 104 is capable of rotating about a first rotation axis 303 and rotating about a second rotation axis 304 each via a rotation support portion 301. In other words, as illustrated in FIG. 3, the monitor 104 is capable of rotating about the first rotation axis 303 relative to the mount portion 112 in clockwise and anticlockwise directions (arrow L and arrow R) that are orthogonal to the optical axis via the rotation support portion 301.

The monitor 104 is also capable of rotating about the second rotation axis 304 relative to the mount portion 112 via the rotation support portion 301 in directions (arrow F and arrow B) at each of which an angle formed with the first rotation axis 303 is 90 degrees.

In the present exemplary embodiment, a state in which the monitor 104 is rotated to the grip portion 203 is described as a state in which the monitor 104 is opened rightward, and a state in which the monitor 104 is rotated to the opposite side is described as a state in which the monitor 104 is opened leftward. Also, of the monitor 104, the rotation in the arrow L direction is the clockwise rotation, the rotation in the arrow R direction is the anticlockwise rotation, the rotation in the arrow F direction is the frontward rotation, and the rotation in the arrow B direction is the backward rotation.

The rotation support portion 301 includes a fixing portion 305 for fixing to the projected portion 113 with a bis or the like, a first rotation portion 306 connected to the fixing portion 305, and a second rotation portion 307 fixed to the casing 403. The rotation support portion protection member 115 prevents the rotation support portion 301 from being exposed (see FIG. 5).

A shaft 308 is formed on the fixing portion 305, and a bearing unit to be inserted into the shaft 308 is formed on the first rotation portion 306. A central axis of the shaft 308 serves as the first rotation axis 303. The first rotation portion 306 is capable of rotating in the clockwise and anticlockwise directions about the first rotation axis 303 in an angle range of about 180 degrees.

Figure 8:
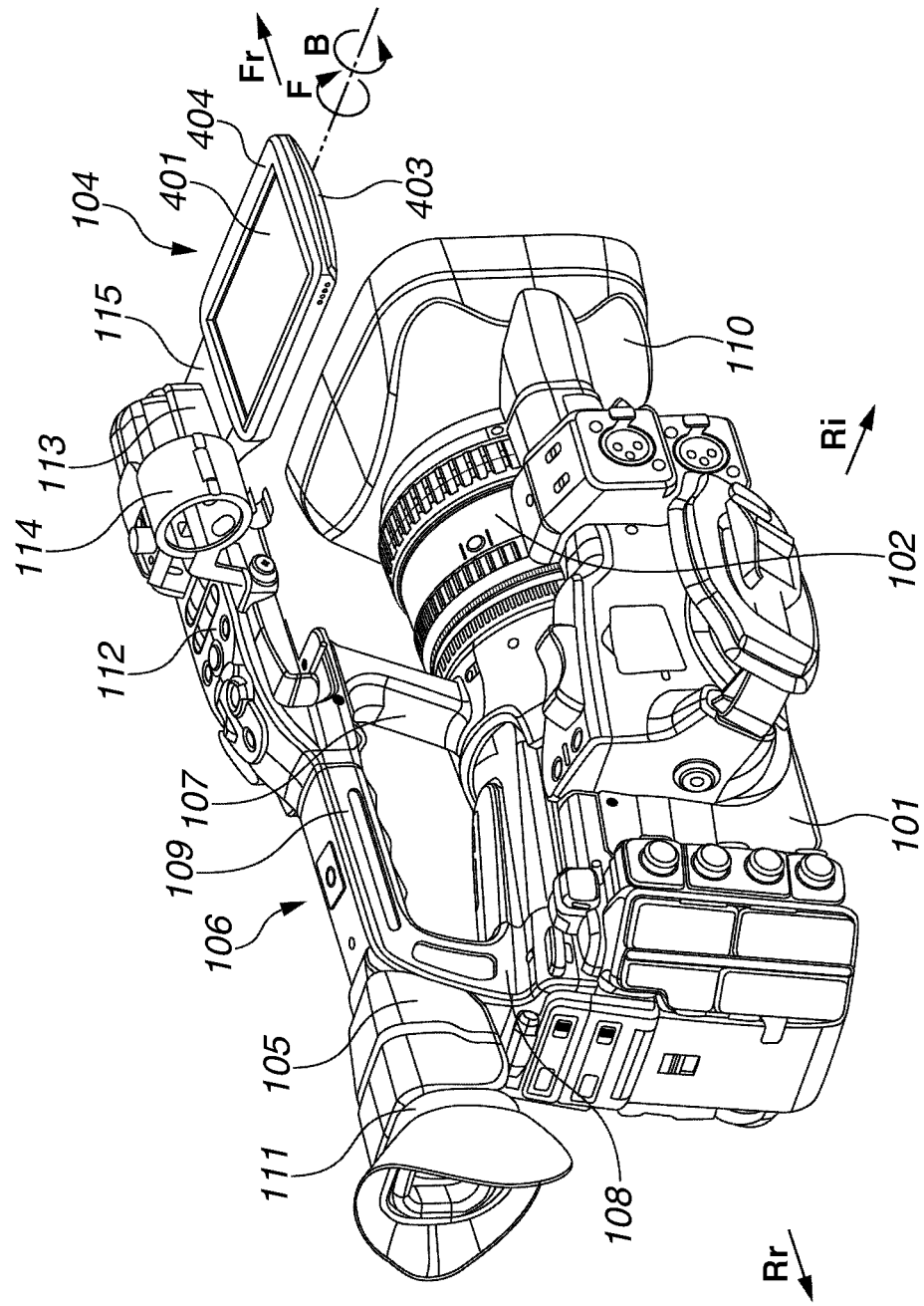
FIG. 8 is a perspective view illustrating the imaging apparatus as viewed from the rear side, in which the display unit is rotated anticlockwise.

Accordingly, the monitor 104 is capable of being displaced from the monitor non use state in which the monitor is not used in the lower part of the mount portion 112 as illustrated in FIGS. 1 and 2, to the state of the monitor 104 being opened to the left by the clockwise direction by 90 degrees as illustrated in FIG. 5. Also, the monitor 104 is capable of being displaced from the monitor non use state to the state of being opened to the right by the anticlockwise rotation by 90 degrees as illustrated in FIG. 8.

FIG. 4 is a diagram illustrating a structure of the rotation support portion 301. In FIG. 4, the monitor 104 is in the monitor non use state, which is illustrated in FIGS. 1 and 2. The first rotation portion 306 is provided with a first detection switch 310 and a second detection switch 311 that are opposed to each other across the shaft 308. An arc-shaped portion 312 for covering a periphery of the shaft 308 at a front part of the shaft 308 is provided. In FIG. 4, each of the first detection switch 310 and the second detection switch 311 is in an off state.

Referring to FIG. 4, when the first rotation portion 306 is rotated about the first rotation axis 303 by about 10 degrees in the anticlockwise direction, an abutting portion 310a of the first detection switch 310 is abutted to the arc-shaped portion 312 and pushed, so that the first detection switch 310 is turned on. Thus, the rotation of the monitor 104 in the direction reverse to that toward the grip portion 203 from the monitor non use state is detected.

Similarly, when the first rotation portion 306 is rotated about the first rotation axis 303 by about 10 degrees in the clockwise direction, an abutting portion 311a of the second detection switch 311 is abutted to the arc-shaped portion 312 and pushed, so that the second detection switch 311 is turned on. Thus, the rotation of the monitor 104 in the direction toward the grip portion 203 from the monitor non use state is detected.

When the first detection switch 310 is in the off state and the second detection switch 311 is also in the off state, the monitor non use state of the monitor 104 illustrated in FIGS. 1 and 2 is detected.

A shaft 309 is formed on the second rotation portion 307, and a bearing unit to be inserted into the shaft 309 is formed on the first rotation portion 306. A central axis of the shaft 309 serves as the second rotation axis 304. The second rotation portion 307 includes a rotational friction mechanism (not illustrated) for holding the monitor 104 at an arbitrary angle.

An axial direction of the second rotation axis 304 is in a direction that forms 90 degrees with the axial direction of the first rotation axis 303. The second rotation portion 307 is capable of rotation about the second rotation axis 304 in the longitudinal directions (arrow F and arrow B) within an angle range of about 270 degrees.

Figure 6:
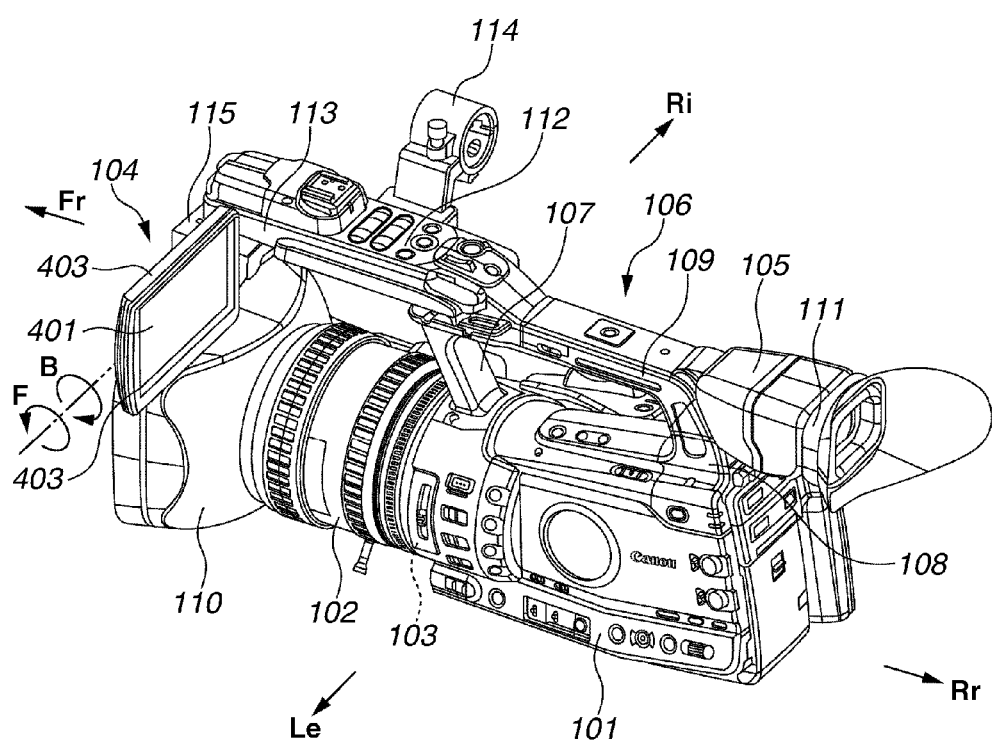
FIG. 6 is a perspective view illustrating the imaging apparatus as viewed from the rear side, in which a display surface of the display unit is directed to a user.

Therefore, when the monitor 104 is rotated to the left of the video camera 10, the monitor 104 is capable of being displaced from a state in which the display surface 401 is directed upward as illustrated in FIG. 5 to a state in which the display surface 401 is directed to the user as illustrated in FIG. 6 (ordinary imaging state) by the backward rotation by 90 degrees.

Also, the monitor 104 is capable of being displaced from the state illustrated in FIG. 6 to a state in which the display surface 401 is directed downward by the further backward rotation by 90 degrees. Further, the monitor 104 is capable of being displaced from the state illustrated in FIG. 7 to a state in which the display surface 401 is directed to the subject (state of imaging the user) by the frontward rotation by 90 degrees.

Figure 9:
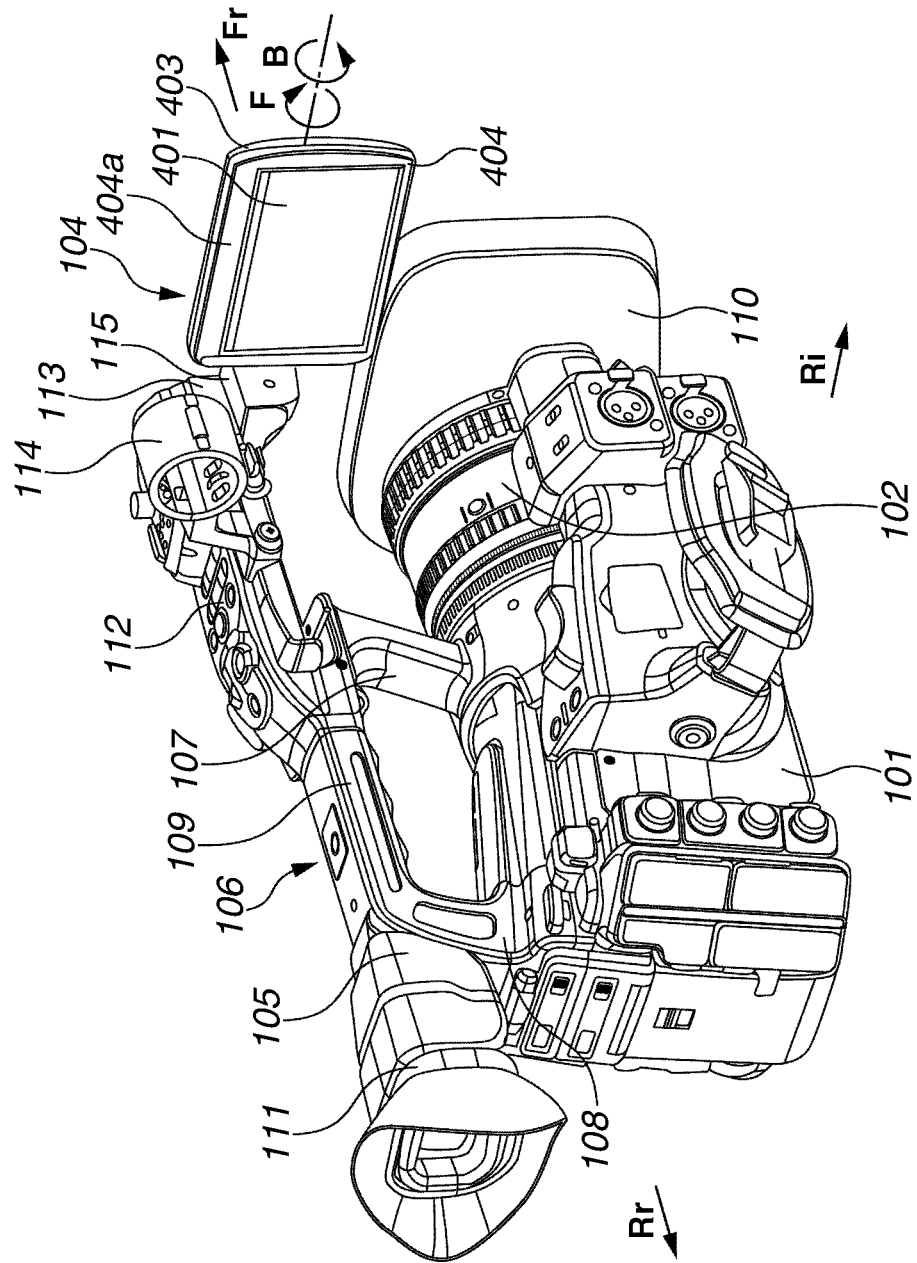
FIG. 9 is a perspective view illustrating the imaging apparatus as viewed from the rear side, in which the display surface of the display unit is directed to the user.

When the monitor 104 is rotated to the right of the video camera 10, the monitor 104 is capable of being displaced from a state in which the monitor 104 is directed upward as illustrated in FIG. 8 to a state in which the display surface 401 is directed to the user as illustrated in FIG. 9 (ordinary imaging state) by the backward rotation by 90 degrees.

Figure 10:
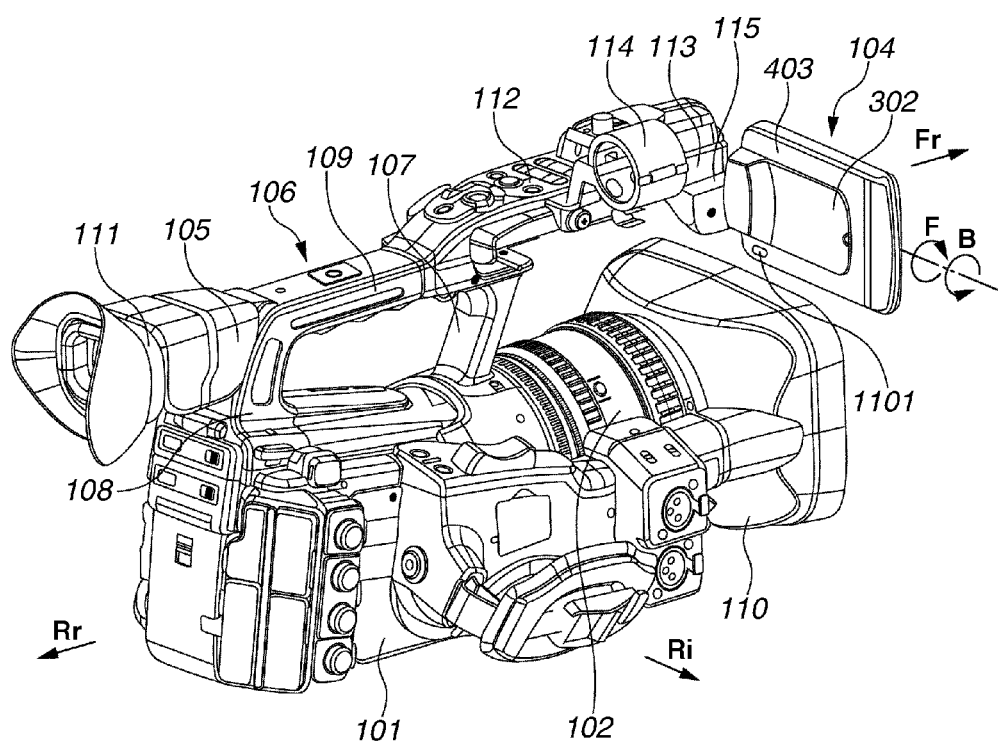
FIG. 10 is a perspective view illustrating the imaging apparatus as viewed from the rear side, in which the display surface of the display unit is directed to the imaging subject.

Also, the monitor 104 is capable of being displaced from the state illustrated in FIG. 8 to a state in which the display surface 401 is directed to the subject as illustrated in FIG. 10 (state of imaging the user) by the frontward rotation by 90 degrees. Further, the monitor 104 is capable of being displaced from the state illustrated in FIG. 10 to a state in which the display surface 401 is directed downward by the further frontward rotation by 90 degrees.

As described above, it is possible to displace the monitor 104 in the same manner at the left and right of the video camera 10.

In the state illustrated in FIGS. 1 and 2, the monitor 104 is non used in the lower part of the mount portion 112 of the handle portion 106 so that the display surface 401 of the monitor 104 is covered with the mount portion 112. Therefore, since the display surface 401 is disposed inwardly in such a manner that the display surface 401 is overlapped with the mount portion 112, it is possible to reliably protect the display surface 401.

Also, since the first rotation axis 303 of the rotation support portion 301 is disposed in front of the mount portion 112 on the optical axis of the lens unit 102, the video camera 10 is capable of excellent imaging works and the like as described below.

By the clockwise rotation by about 90 degrees of the monitor 104 from the state illustrated in FIGS. 1 and 2, it is possible to displace the monitor 104 to a state in which the display surface 401 is directed upward at the left of the camera main body 101 as illustrated in FIG. 5. In this state, the user can perform imaging while confirming an image of a subject from above the display surface 401 of the monitor 104.

Figure 7:
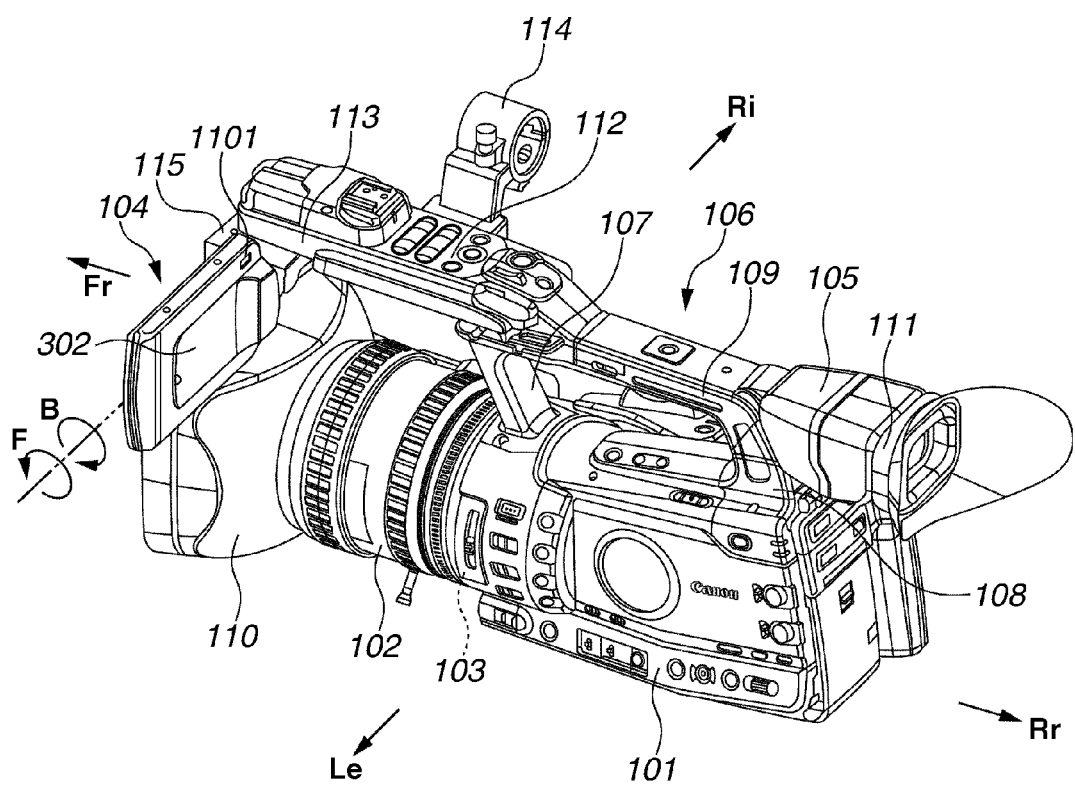
FIG. 7 is a perspective view illustrating the imaging apparatus as viewed from the rear side, in which the display surface of the display unit is directed to an imaging subject.

Further, by the frontward rotation of the monitor 104 by about 90 degrees from the state illustrated in FIG. 5, it is possible to displace the monitor 104 to a state in which the display surface 401 is directed to the subject as illustrated in FIG. 7.

By the backward rotation by about 90 degrees of the monitor 104 from the state illustrated in FIG. 5, it is possible to displace the monitor to a state in which the display surface 401 is directed to the user as illustrated in FIG. 6. In this case, since it is possible to ensure an optimum distance D between the eye of the user and the display surface 401 as illustrated in FIG. 11, the user can perform imaging while holding the video camera 10 at ease and visually confirming the display surface 401 without largely changing the direction of the eyes.

In this state, when the user holds the video camera 10 in such a manner that the cheek of the user contacts the electronic view finder 105 as illustrated in FIG. 11, the user can hold the video camera 10 with the display surface 401 of the monitor 104 being set on the direction of the eyes of the user. Further, since the user can hold the video camera 10 with the arms contacting the user's sides, the user can hold the video camera 10 with relatively small strength without using great strength of the arms.

Therefore, it is possible to diminish fatigue and to perform excellent imaging with suppressed blurring in long-time imaging owing to the stable display surface 401.

Also, it is possible to displace the monitor 104 to a state in which the display surface 401 is directed upward at the right of the camera main body 101 as illustrated in FIG. 8 by rotating the monitor 104 anticlockwise by about 90 degrees from the state illustrated in FIGS. 1 and 2. Further, it is possible to displace the monitor 104 to a state in which the display surface 401 is directed to the subject as illustrated in FIG. 10 by rotating the monitor 104 frontward by about 90 degrees from the state illustrated in FIG. 8.

Also, it is possible to displace the monitor 104 to a state in which the display surface 401 is directed to the user as illustrated in FIG. 9 by rotating the monitor 104 backward by about 90 degrees from the state illustrated in FIG. 8.

In the present exemplary embodiment, the user can arbitrarily change a method of displaying an image that is imaged by the imaging unit 103 to be displayed on the monitor 104. More specifically, the user can arbitrarily change a display direction of the image. Referring to FIG. 12, the user can change the display direction by turning on and off an inversion display flag by pressing a display inversion operation button 1101 provided on a reverse face 302 of the monitor 104 serving as an operation member.

A light emission unit 402 for irradiating the display surface 401 with backlight, which is indicated by a broken line in FIG. 12, is provided in the casing 403 (in the display unit) of the monitor 104 of the present exemplary embodiment. The display inversion operation button 1101 is provided at a position in the vicinity of the light emission unit 402, which is a position overlapping with or a position substantially overlapping with the light emission unit 402 in a thickness direction of the monitor 104 in the present exemplary embodiment.

Referring back to FIG. 5, among outer frames 404 around the display surface 401, the outer frame 404a on one side covering the light emission unit 402 as viewed from the display surface 401 has a larger width as compared with the rest of outer frames 404 on the rest of sides. Therefore, since the user can press the display inversion operation button 1101 by placing a finger or fingers on the wider outer frame 404a, operability for pressing the display inversion operation button 1101 is improved.

Though the display inversion operation button 1101 is disposed on the reverse face 302 of the monitor 104 in the present exemplary embodiment, the display inversion operation button 1101 may be provided on the outer frame 404 of the monitor 104. Also, the display inversion operation button 1101 may be disposed on an upper surface of the mount portion 112 of the camera main body 101.

When the display surface 401 is directed to the subject when the monitor 104 is at the left of the camera main body 101 as illustrated in FIG. 7, the display inversion operation button 1101 is at an upper part of the reverse face 302 of the monitor 104 and close to the projected portion 113.

Therefore, the user can easily press the display inversion operation button 1101 by the left hand that does not support the grip portion 203 while confirming the display inversion operation button 1101. More specifically, the user performs the operation without causing blurring in the video camera 10 by pressing the display inversion operation button 1101 with the thumb of the left hand while placing the fingers other than the thumb of the left hand on the outer frame 404 of the casing 403 at the side of the display surface 401.

Hereinafter, a processing operation for changing the display direction of an image to be displayed by the video camera 10 on the monitor 104 by pressing (user operation) of the display inversion operation button 1101 will be described.

To start with, a main configuration of the video camera 10 for performing the above-described processing operation will be described with reference to FIG. 13. FIG. 13 is a block diagram illustrating the main configuration of the video camera 10. The constituent elements similar to those described above will be denoted by the same reference numerals, and the descriptions of the same constituent elements will be omitted.

As illustrated in FIG. 13, the video camera 10 has a display control unit 1203. The display control unit 1203 sends a subject image generated by the imaging unit 103 to the monitor 104 so that the image is displayed on the display surface 401. When the monitor 104 is non used in the mount portion 112, the first detection switch 310 and the second detection switch 311 are in the off state, so that the display control unit 1203 maintains the monitor 104 to a non-display state.

When the monitor 104 in the non use state is rotated anti-clockwise (direction of the arrow L) which is a first direction from the mount portion 112 by 10 degrees or more, the first detection switch 310 is turned on. Accordingly, the display control unit 1203 displays a captured subject image on the display surface 401 of the monitor 104.

Here, the display control unit 1203 displays on the monitor 104 the subject image in a first display direction in which the subject image in an erected state is displayed when the display surface 401 is viewed from the user in a state where the display surface 401 of the monitor 104 is directed to the user as illustrated in FIG. 5 or 6. The state illustrated in FIG. 5 or 6 is a first use state.

Next, when the user operates the display inversion operation button 1101, an inversion display flag is turned on, and the display control unit 1203 changes the display direction of the subject image to be displayed on the monitor 104. More specifically, the display control unit 1203 changes from the first display direction to a second display direction in which the subject image in an erected state is displayed when the display surface 401 is viewed from the subject in a state where the display surface 401 of the monitor 104 is directed to the subject as illustrated in FIG. 7.

In short, the display control unit 1203 inverts the displayed subject image about a center in a vertical direction of the display surface 401 in a vertically symmetrical manner. The display control unit 1203 turns on or off the inversion display flag when the display inversion operation button 1101 is pressed to change the first direction to the second direction or the second direction to the first direction.

When the monitor 104 in the non use state is rotated clockwise (direction of the arrow R) which is the second direction reverse to the first direction from the mount portion 112 by 10 degrees or more, the second detection switch 311 is turned on. Accordingly, the display control unit 1203 displays a captured subject image on the display surface 401 of the monitor 104.

Here, the display control unit 1203 displays on the monitor 104 the subject image in the second display direction in which the subject image in an erected state is displayed when the display surface 401 is viewed from the user in a state where the display surface 401 of the monitor 104 is directed to the user as illustrated in FIG. 8 or 9. The state illustrated in FIG. 8 or 9 is a second use state.

Next, when the user operates the display inversion operation button 1101, an inversion display flag is turned on, and the display control unit 1203 changes the display direction of the subject image to be displayed on the monitor 104. More specifically, the display control unit 1203 changes from the second display direction to the first display direction in which the subject image in an erected state is displayed when the display surface 401 is viewed from the subject in a state where the display surface 401 of the monitor 104 is directed to the subject as illustrated in FIG. 10.

In short, the display control unit 120 inverts the displayed subject image about a center in a vertical direction of the display surface 401 in a vertically symmetrical manner. The display control unit 1203 turns on or off the inversion display flag when the display inversion operation button 1101 is pressed down to change the first direction to the second direction or the second direction to the first direction.

Hereinafter, a processing operation for changing an image to be displayed by the video camera 10 on the monitor 104 to the first direction or the second direction will be described with reference to the flowchart illustrated in FIG. 14.

In Step S1301, power is supplied to the video camera 10. In Step S1302, the display control unit 1203 determines whether the first detection switch 310 is in the on state. When the first detection switch 310 is in the on state (YES in Step S1301), the processing proceeds to Step S1305. When the first detection switch 310 is not in the on state (NO in Step S1301), the processing proceeds to Step S1303.

In Step S1305, the display control unit 1203 displays a subject image in the first direction on the monitor 104, and the processing proceeds to Step S1306. In Step S1306, the display control unit 1203 determines whether the user operates the display inversion operation button 1101.

When the user does not operate the display inversion operation button 1101 (NO in Step S1306), the processing proceeds to Step S1313. When the user operates the display inversion operation button 1101 (YES in Step S1306), the processing proceeds to Step S1307. In Step S1307, the display control unit 1203 turns the inversion display flag on, and the processing proceeds to Step S1308. In Step S1308, the display control unit 1203 displays the subject image on the monitor 104 in the second display direction, and the processing proceeds to Step S1313.

In Step S1303, the display control unit 1203 determines whether the second detection switch 311 is in the on state. When the second detection switch 311 is in the on state (YES in Step S1303), the processing proceeds to Step S1309. When the second detection switch 311 is not in the on state (NO in Step S1303), the processing proceeds to Step S1304.

In Step S1309, the display control unit 1203 displays the subject image on the monitor 104 in the second display direction, and the processing proceeds to Step 1310. In step S1310, the display control unit 1203 determines whether the user operates the display inversion operation button 1101.

When the user does not operate the display inversion operation button 1101 (NO in Step S1310), the processing proceeds to Step S1313. When the user operates the display inversion operation button 1101 (YES in Step S1310), the processing proceeds to Step S1311. In Step S1311, the display control unit 1203 turns the inversion display flag on, and the processing proceeds to Step S1312. In Step S1312, the display control unit 1203 displays the subject image on the monitor 104 in the first display direction, and the processing proceeds to Step S1313.

In Step S1304, the display control unit 1203 turns off the inversion display flag, and the processing proceeds to Step S1313. In other words, in Step S1304, the inversion display flag is forcibly turned off even when the user does not operate the display inversion operation button 1101. In short, the inversion display flag is forcibly turned off by bringing the monitor 104 into the monitor non use state.

In Step S1313, it is determined whether the power of the video camera 10 is turned off. When the power is turned off (YES in Step S1313), the operation processing for changing the display direction is brought to an end. When the power is not turned off (NO in Step S1313), the processing returns to Step S1302. It is possible to turn off the power of the video camera 10 irrespective of the state of the monitor 104.

As described above, in the present exemplary embodiment, the user can arbitrarily operate the display inversion of the image to be displayed on the monitor 104 via the display inversion operation button 1101. Therefore, it is possible for the user to perform the display inversion of the image displayed on the monitor 104 when the user is at a position desired by the user.

Since the display inversion of the image displayed on the display surface 401 of the monitor 104 is automatically cancelled when the monitor 104 is non used in the mount portion 112, the user does not have to cancel the display inversion of the image displayed on the display surface 401, thereby improving usability.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-257336 filed Nov. 10, 2009, which is hereby incorporated by reference herein in its entirety.

What is claimed is:

1. An imaging apparatus comprising:
a display unit configured to display an image of a subject, wherein the display unit is displaced from a non use position to a first use position by displacement in a first direction, wherein the display unit is displaced from the non use position to a second use position by displacement in a second direction which is reverse to the first direction;
a detection unit configured to detect that the display unit is in the non use position;
an operation member configured to be operable by a user; and
a display control unit configured to control the display unit so that the display unit displays the image when the display unit is in the first use position or the second use position, wherein the display control unit changes an upper direction of the image in accordance with the display unit being in the first use position or the second use position, wherein the display control unit inverts the upper direction of the image in response to an operation on the operation member regardless of the display unit being in the first use position or the second use position, wherein the display control unit cancels the inversion when the detection unit detects that the display unit is in the non use position.

2. The imaging apparatus according to claim 1,
wherein the display unit includes a display surface on which an image of a subject is displayed,
wherein the display surface of the display unit is directed to the subject or the user when the display unit is in the first use position or the second use position,
wherein the display unit is displaced from the non use position to the first use position by rotation in the first direction around a first rotation axis,
wherein the display unit is displaced from the non use position to the second use position by rotation in the second direction around the first rotation axis, and
wherein the display surface of the display unit is directed to the subject or the user by rotation around a second rotation axis which is orthogonal to the first rotation axis.

3. The imaging apparatus according to claim 1,
wherein the detection unit includes a first detection switch and a second detection switch,
wherein the first detection switch configured to detect the displacement of the display unit from the non use position in the first direction, wherein the second detection switch configured to detect the displacement of the display unit from the non use position in the second direction, and wherein if the first detection switch does not detect the displacement of the display unit from the non use position in the first direction, and the second detection switch does not detect the displacement of the display unit from the non use position in the second direction, the detection unit detects that the display unit is in the non use position.

4. The imaging apparatus according to claim 2, further comprising:

a handle portion including mount portion, wherein the display surface is covered with the mount portion when the display unit is in the non use position.

5. The imaging apparatus according to claim 2, wherein the operation member is disposed on a reverse face of the display surface.

6. The imaging apparatus according to claim 2, wherein the operation member is disposed on reverse face of the display unit in the vicinity of a light emission unit provided in the display unit.

7. The imaging apparatus according to claim 1, further comprising:

a grip portion configured to allow the user to hold the imaging apparatus at a right side portion of a camera main body of the imaging apparatus, wherein the operation member is positioned at an upper portion of the display unit in a case where the display unit is positioned at an opposite side to the grip portion with the display surface being directed to the subject.

* * * * *